United States Patent
Miyahisa et al.

(10) Patent No.: US 6,878,173 B2
(45) Date of Patent: Apr. 12, 2005

(54) METHOD FOR MANUFACTURING ELECTRODE PLATE FOR CELL

(75) Inventors: Masaharu Miyahisa, Fujisawa (JP); Hideyuki Kumakiri, Chigasaki (JP); Takehiko Matsunaga, Fujisawa (JP); Koichi Kojima, Odawara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 211 days.

(21) Appl. No.: 10/111,665
(22) PCT Filed: Aug. 29, 2001
(86) PCT No.: PCT/JP01/07444
§ 371 (c)(1), (2), (4) Date: May 22, 2002
(87) PCT Pub. No.: WO02/19447
PCT Pub. Date: Mar. 7, 2002

(65) Prior Publication Data
US 2002/0182483 A1 Dec. 5, 2002

(30) Foreign Application Priority Data
Aug. 30, 2000 (JP) .................................. 2000-261471

(51) Int. Cl.$^7$ ................................ H01M 6/00
(52) U.S. Cl. .................. 29/623.5; 429/122; 429/236; 429/243; 429/44; 264/29.1; 264/29.5; 29/623.1
(58) Field of Search ..................... 29/623.1, 623.5; 429/44, 122, 236, 243; 264/29.1, 29.5

(56) References Cited

U.S. PATENT DOCUMENTS

| 4,115,627 A | * | 9/1978 | Christner et al. ............. 429/44 |
| 4,426,340 A | * | 1/1984 | Goller et al. ............... 264/29.1 |
| 5,045,415 A | * | 9/1991 | Witehira ..................... 429/81 |

FOREIGN PATENT DOCUMENTS

| JP | 62-136759 | 6/1987 |
| JP | 63-040253 | 2/1988 |
| JP | 9-063575 | 3/1997 |
| JP | 10-247493 | 9/1998 |
| JP | 2000-077054 | 3/2000 |

* cited by examiner

Primary Examiner—Mark Ruthkosky
(74) Attorney, Agent, or Firm—Jordan and Hamburg LLP

(57) ABSTRACT

A battery electrode plate (19) is produced via an active material impregnation step for impregnating an entire porous core substrate shaped like a thin plate (1) with an active material (3), a pressing step for performing press working on the core substrate to form a plurality of rail shaped protrusions (8), an active material removal step for removing the active material to form core substrate exposed sections (13) by applying ultrasonic vibrations to the rail shaped protrusions, a flattening step for compressing the core substrate exposed sections down to an identical level with the other sections, and a cutting step for cutting predetermined sections including the core substrate exposed sections.

2 Claims, 7 Drawing Sheets

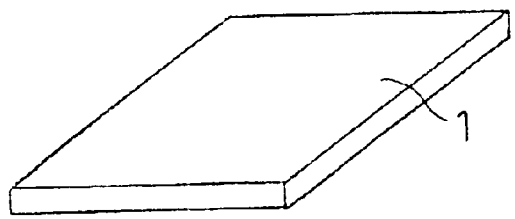
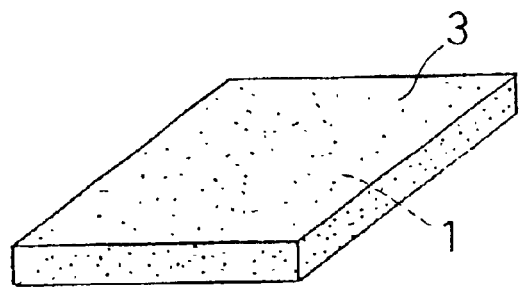
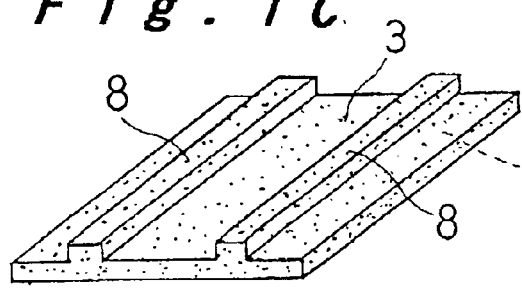
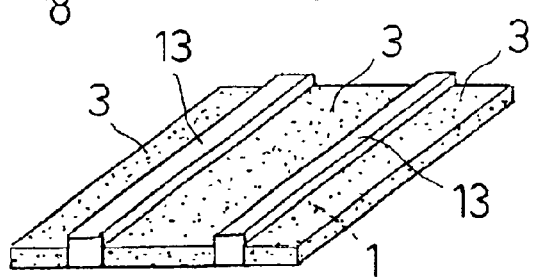
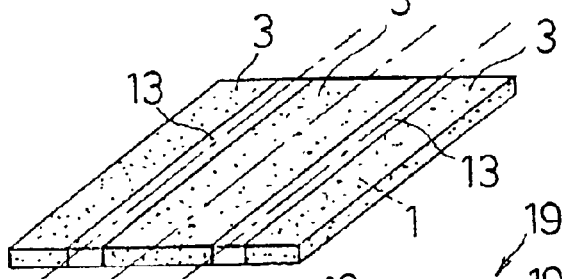
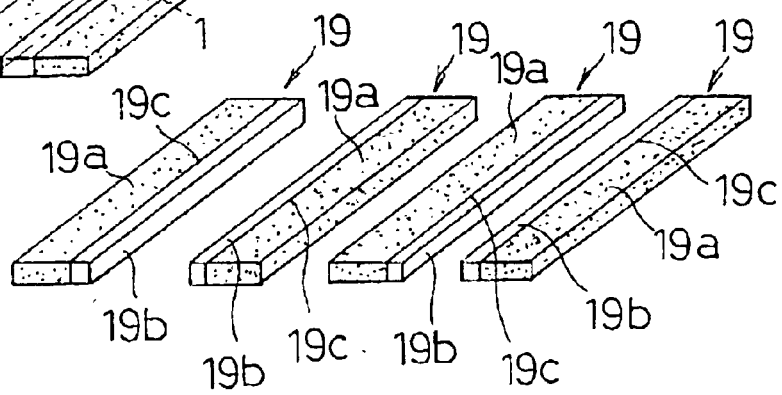

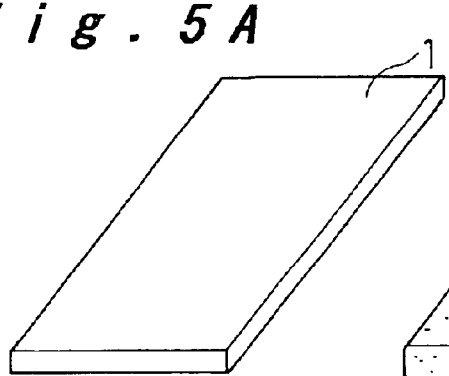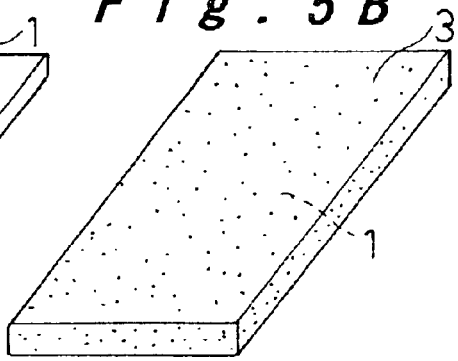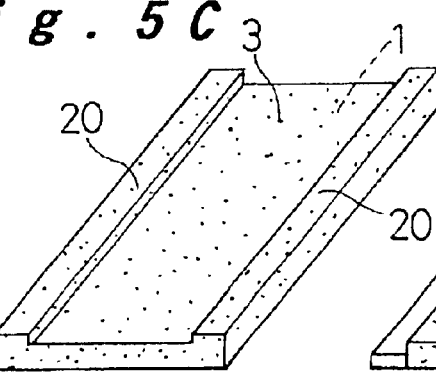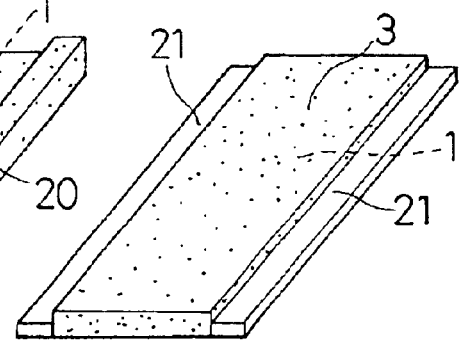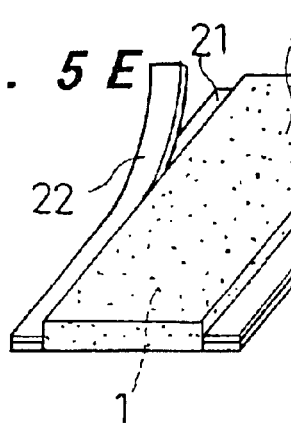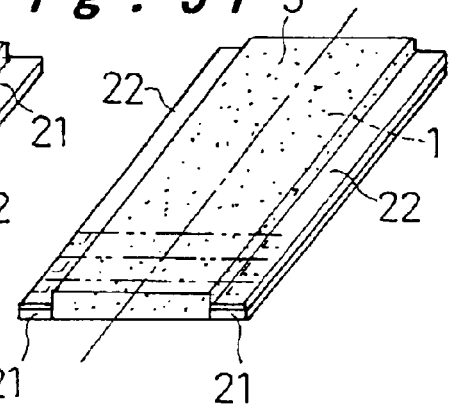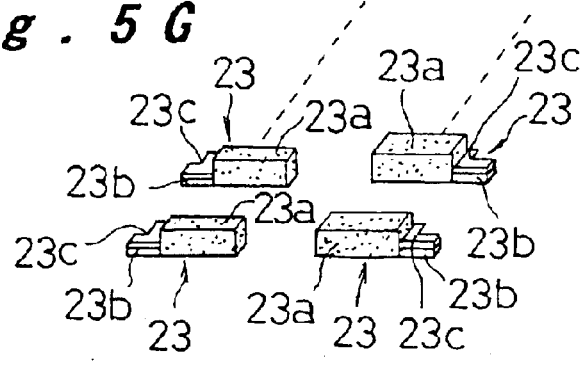

METHOD FOR MANUFACTURING ELECTRODE PLATE FOR CELL

TECHNICAL FIELD

The present invention relates to a battery electrode plate used in a rechargeable battery such as a nickel metal hydride battery or a nickel cadmium battery, and more particularly to a method and apparatus for manufacturing a non-sintered battery electrode plate including a foamed metal core substrate impregnated with an active material, and a battery using such a battery electrode plate.

BACKGROUND ART

Amongst electrode plates for rechargeable batteries, those produced using a foamed metal with a three dimensional network structure as a core substrate, by impregnating the core substrate with an active material, display comparatively superior discharge capacities, and are widely used. In addition, in recent years there has been strong demand for improvements in the high rate discharge characteristics of batteries, and as a result, new battery electrode plate manufacturing methods have been proposed, such as that shown in FIG. 7A to FIG. 7E disclosed in Japanese Laid-Open Patent Publication No. 2000-77054. Firstly, in a first pressing process, two slots 2 of predetermined width are formed in a core substrate 1 composed of a foamed metal, with the two slots parallel with both edges of the core substrate. Once the core substrate 1 has been impregnated with an active material 3, the active material 3 accumulated inside the slots 2 is removed using a brush or the like. Subsequently, in a second pressing process, the core substrate 1 is subjected to three press working steps and converted to a form shown in FIG. 7C in which the entire surface is level with the bottom of the slots 2. The sections where the slots 2 had been formed are then subjected to an active material removal process using a brush and an air blower to form core substrate exposed sections 4 as shown in FIG. 7D. The core substrate 1 is then cut, forming battery electrode plates 7.

A current collector 7b including the core substrate exposed section 4 is formed on one edge of the battery electrode plate 7, and a cylindrical electrode group formed by winding this electrode plate has a current collector on one end surface. Because this electrode group collects current uniformly along the entire length of the battery electrode plate, the current collecting efficiency improves. In addition, by employing a tab-less method wherein a current collecting lead plate is welded to the aforementioned current collector, the current collection characteristics improve markedly, enabling the demands for improvements in high rate discharge characteristics to be met.

However, the battery electrode plate 7 prepared by the processes described above suffers from the problems described below. A first problem is that because variations in the impregnation density of the active material 3 occur within active material impregnated sections 7a, there is a variation in the capacity of batteries produced using these battery electrode plates 7, and so when applied to a battery pack, there is an increased likelihood of over charging or over discharging.

A second problem is that because a boundary line 7c between the active material impregnated section 7a and the current collector 7b is not a true straight line, the precision of the dimensions and shape of the battery electrode plate 7 is low, leading to a reduction in the current collecting function of a battery produced using this battery electrode plate 7, and a failure to achieve high rate discharge characteristics.

A third problem is that because the removal of the active material 3 from the current collector 7b is imperfect, there is an increased likelihood of unsatisfactory welding occurring during attachment of the current collecting lead plate to the current collector 7b, resulting in a reduced yield. Removal of the active material using a brush and air blower is also inefficient, and invites a reduction in productivity.

A fourth problem is that the width of the core substrate exposed sections 4 shown in FIG. 7D, prior to cutting, differs from the preset value. As a result, a method wherein the core substrate exposed section is folded at right angles and then compressed to form the current collector cannot be applied, and so it becomes impossible to ensure the mechanical strength of the current collector or a high current collection efficiency.

A fifth problem is that the battery electrode plates 7 obtained by cutting the core substrate 1 are susceptible to warping into a bow shape. When the battery electrode plate 7 is wound into a spiral shape to form an electrode group, this warping can be the cause of weaving, resulting in an electrode group of an unsatisfactory shape. Moreover, not only does this warping occur, but when viewed at magnification under a microscope, it is apparent that fine cracks also develop at the boundary section between the active material impregnated section 7a and the current collector 7b, and sections of the metallic skeleton of the core substrate 1 rupture, leading to a deterioration in strength. As a result, this type of battery electrode plate 7 is susceptible to problems such as dropout of the active material 3, short circuiting, and deterioration in the electrical conductivity.

Japanese Laid-Open Patent Publication No. 2000-77054 discloses another method of manufacturing a battery electrode plate. This method involves impregnating an entire core substrate composed of a foamed metal with an active material, subsequently carrying out press working to compress the entire core substrate to a predetermined thickness, and then forming core substrate exposed sections by removing the active material from certain regions using an ultrasonic vibration device.

However in this method, because the boundary line between the active material impregnated sections and the current collector of the battery electrode plate is not a true straight line, there is a deterioration in the current collecting function of a battery produced using this battery electrode plate, and high rate discharge characteristics are unobtainable. This is because a large amplitude ultrasonic vibration must be applied in order to remove the active material after the press working, and as a result, even the active material in the regions surrounding the core substrate exposed sections is removed. In addition, there is a danger that the metallic skeleton of the core substrate may suffer damage or deterioration when exposed to large amplitude ultrasonic vibrations.

Consequently, the present invention takes the conventional problems described above into consideration, with an object of providing a method and apparatus for manufacturing a battery electrode plate in which there is no variation in the impregnation density of the active material, the boundary line between the active material impregnated sections and the current collector is a true straight line, the residual ratio of the active material in the current collector is low, and the entire current collector has a predetermined width, as well as providing a battery which utilizes such a battery electrode plate.

DISCLOSURE OF THE INVENTION

In order to achieve the above object, a method for manufacturing a battery electrode plate according to the present invention includes an active material impregnation step for impregnating an entire porous core substrate shaped like a thin plate with an active material; a pressing step for performing press working on the active material impregnated core substrate to form a plurality of rail shaped protrusions; an active material removal step for removing the active material to form core substrate exposed sections by applying ultrasonic vibrations to the rail shaped protrusions; a flattening step for pressing down on the top of the core substrate exposed sections and compressing the exposed sections down to the same level as the other sections; and a cutting step for cutting predetermined sections including the core substrate exposed sections to form individual battery electrode plates.

An electrode group produced by spirally winding the battery electrode plates of a positive and negative electrode produced by the above method, with a separator interposed therebetween, can be placed within a cylindrical battery case to form a cylindrical battery.

Another method for manufacturing a battery electrode plate according to the invention includes an active material impregnation step for impregnating an entire porous core substrate shaped like a thin plate with an active material; a pressing step for performing press working on the active material impregnated core substrate to form a plurality of rail shaped protrusions; an active material removal step for removing the active material to form core substrate exposed sections by applying ultrasonic vibrations to the rail shaped protrusions; a core substrate exposed section compression step for compressing the core substrate exposed sections; a lead welding step for seam welding a lead hoop to the core substrate exposed sections; and a cutting step for cutting predetermined sections including the lead hoop to form individual battery electrode plates.

An electrode group produced by alternately laminating the battery electrode plates of a positive and negative electrode produced by the above method, with a separator interposed therebetween, can be placed within a prismatic battery case to form a prismatic battery.

An apparatus for manufacturing a battery electrode plate of the present invention includes a stripe roller press device for performing press working on an active material impregnated core substrate formed from a porous core substrate shaped like a thin plate, to form a plurality of rail shaped protrusions; and an active material removal device including an ultrasonic vibration device for bringing an ultrasound generation horn into contact with the rail shaped protrusions and applying ultrasonic vibrations and a vacuum suction device positioned in an opposing position below each ultrasonic vibration device for suctioning the active material removed by the application of ultrasonic vibrations.

Another apparatus for manufacturing a battery electrode plate of the invention includes a stripe roller press device for performing press working on an active material impregnated core substrate formed from a porous core substrate shaped like a thin plate, to form a plurality of rail shaped protrusions; an active material removal device including an ultrasonic vibration device for bringing an ultrasound generation horn into contact with the rail shaped protrusions and applying ultrasonic vibrations and a vacuum suction device positioned in an opposing position below each ultrasonic vibration device for suctioning the active material removed by the application of ultrasonic vibrations; a welding device for seam welding a lead hoop to a core substrate exposed sections formed by the active material removal device; and a cutter for cutting predetermined sections including the lead hoop to form individual battery electrode plates.

BRIEF DESCRIPTION OF THE DRAWINGS

FIG. 1A, FIG. 1B, FIG. 1C, FIG. 1D, FIG. 1E and FIG. 1F are perspective views showing the sequence of production steps in a method for manufacturing a battery electrode plate according to a first embodiment of the present invention;

FIG. 5A, FIG. 5B, FIG. 5C, FIG. 5D, FIG. 5E, FIG. 5F and FIG. 5G are perspective views showing the sequence of production steps in a method for manufacturing a battery electrode plate according to a second embodiment of the invention;

BEST MODE FOR CARRYING OUT THE INVENTION

Figure 2A:
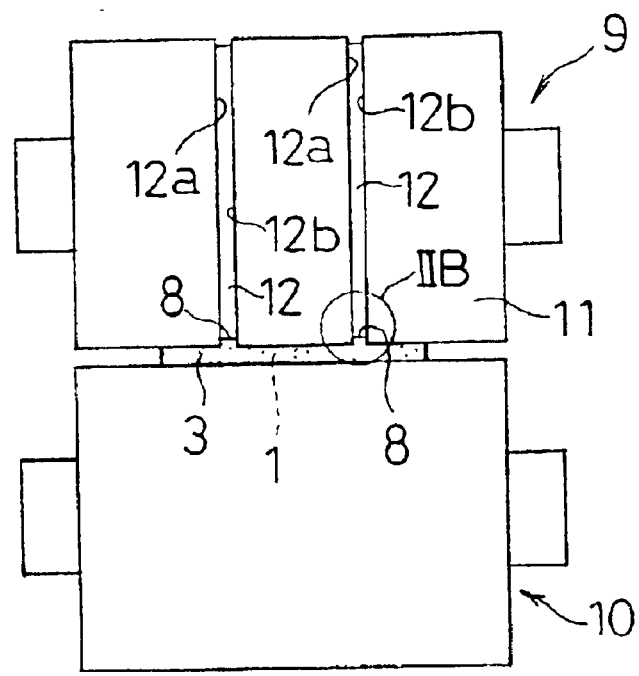
FIG. 2A is a front view showing a stripe roller press device used in a pressing step of the above method.

As follows is a description of preferred embodiments of the present invention, with reference to the drawings. FIG. 1A through FIG. 1F are perspective views showing the sequence of production steps in a method for manufacturing a battery electrode plate according to a first embodiment of the invention. First, an entire core substrate 1 formed from a rectangular sheet of foamed metal of a predetermined size, shown in FIG. 1A, is impregnated with an active material 3 as shown in FIG. 1B. The active material 3 is impregnated into the totally flat core substrate 1 prior to press working, and so is impregnated with a uniform density throughout the entire core substrate 1, and moreover because the surface of the core substrate 1 is not irregular, namely there are no elevation differences, the active material 3 is retained within the substrate without flowing, and consequently dries with the uniform impregnation density maintained. In this embodiment, the core substrate 1 is a foamed nickel metal with a three dimensional network structure, and is formed as a rectangular thin sheet with a thickness of 1.24 mm, for example. However, the manufacturing method of this embodiment should preferably be applied to a continuous strip type core substrate, namely a hoop core substrate.

Next, as shown in FIG. 1C, the entire surface of the core substrate 1 with the exception of those sections which form core substrate exposed sections 13 in subsequent steps, is subjected to press working, and the thickness of the substrate is compressed to approximately half, from the aforementioned 1.24 mm, down to 0.6 mm for example. At this point, two parallel rail shaped protrusions 8, 8 with a thickness of approximately 0.9 mm to 1.1 mm are formed. A stripe roller press device 9 such as that shown in FIG. 2A is used for this press working.

Figure 2B:
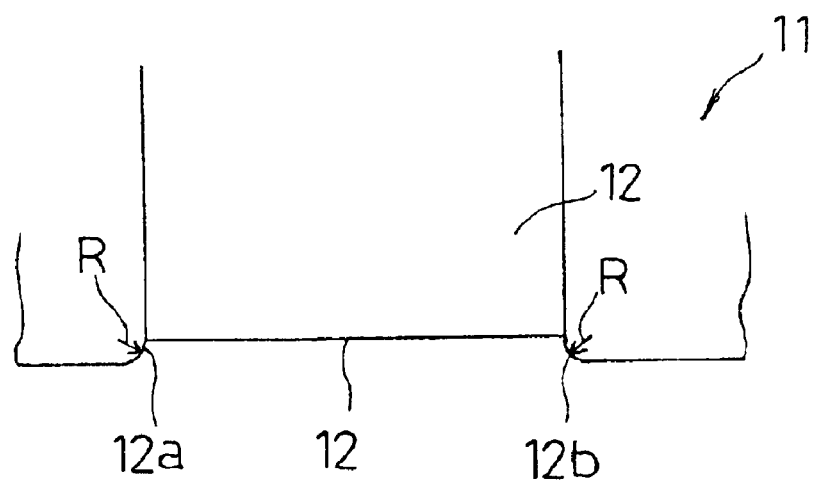
FIG. 2B is an enlarged view of the portion IIB of FIG. 2A.

FIG. 2A is a front view of the stripe roller press device 9, and FIG. 2B is an enlarged view of the portion IIB of FIG. 2A. The stripe roller press device 9 includes a supporting press roller 10 and a working press roller 11, wherein the supporting press roller 10 is supported at a fixed position but is free to rotate, and the working press roller 11 is subjected to a predetermined pressure toward the press roller 10. Accordingly, the working press roller 11 possesses a rigidity capable of withstanding the applied pressure, and is provide with annular slots 12, 12 at two predetermined positions around the circumference of the roller for forming the protrusions 8, 8. As can be seen in FIG. 2B, the opening rim sections of the two side walls 12a, 12b of the annular slots 12 are curved surfaces with a radius of curvature R of 0.3 mm to 0.6 mm, for example.

Furthermore, the two press rollers 10, 11 have comparatively large roller diameters of 550 mm for example, and in the pressing step of this embodiment, the active material impregnated core substrate 1 which passes between the two press rollers 10, 11 is worked from the state shown in FIG. 1B to the state shown in FIG. 1C in a single press working step in which a comparatively large pressure of 300 ton, for example, is applied. The pitch of the two rail shaped protrusions 8, 8 thus formed is determined by the dimensions of the annular slots 12, and conforms precisely to the preset value.

Whereas a conventional method for manufacturing a battery electrode plate includes two pressing steps, in the manufacturing method of this embodiment, only one pressing step is needed for forming the two protrusions 8, 8, and so elongation and deformation of the core substrate is suppressed, although the single pressing step must be able to ensure the predetermined thickness and the predetermined impregnation density of the active material 3 described above. As a result, experimental results revealed that 3 ton of load was necessary per 1 cm width of electrode plate. In practice, in order to ensure a uniform width for the protrusion 8 along the entire substrate, the gap between the two press rollers 10, 11 should preferably be widened and set at a value of 0.3 mm for example, and in such a case, an applied pressure of 10 ton/cm is required.

Figure 7A:
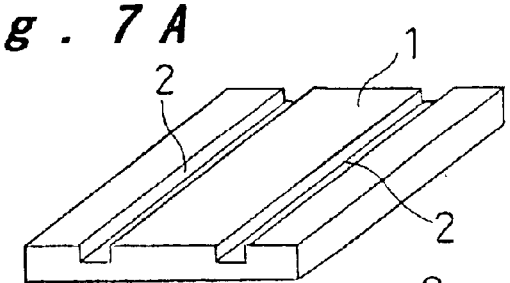
FIG. 7A, FIG. 7B, FIG. 7C, FIG. 7D and FIG. 7E are perspective views showing the sequence of production steps in a conventional method for manufacturing a battery electrode plate.
Figure 7B:
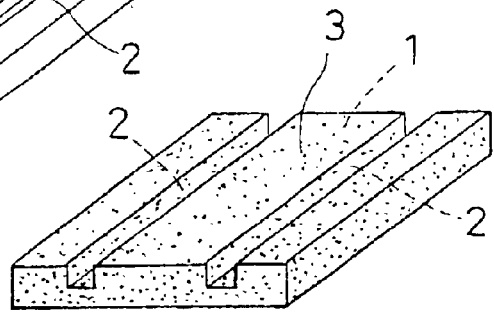
Figure 7C:
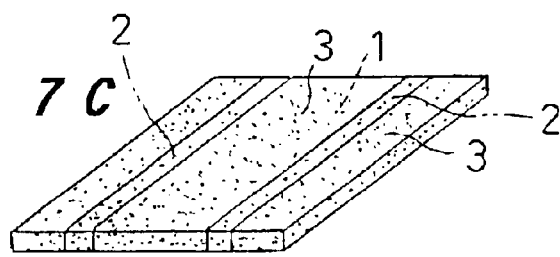
Figure 7D:
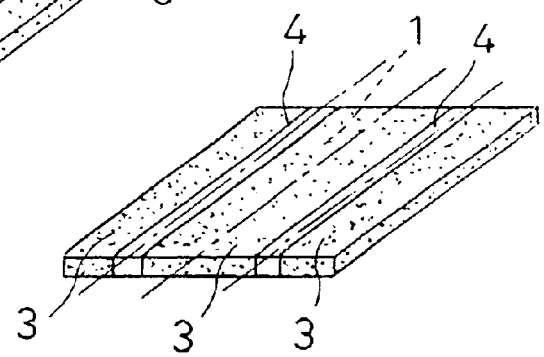
Figure 7E:
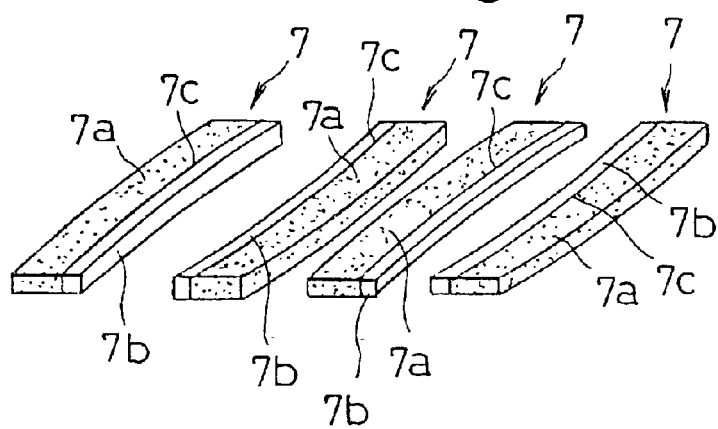

Furthermore, because a foamed metal formed from pure nickel, which displays excellent expansibility, is used for the core substrate 1, during the pressing step, those portions with a high impregnation density of the active material 3 display a larger degree of elongation. This variation in elongation is suppressed by increasing the roller diameter of the press rollers 10, 11. For example, whereas a press roller with a diameter of 400 mm used in the second pressing step of the conventional manufacturing method shown in FIG. 7C generates a lengthwise elongation of between 3.3% and 3.5%, the press rollers 10, 11 with a diameter of 550 mm used in the embodiment generate an elongation of between 1.7% and 1.9% with the same compression ratio. In other words, the larger the roller diameter, the smaller the elongation of the core substrate 1 will be. The reason for this observation is that the larger the diameter of the press rollers become, the closer the process will be to flat press working. Consequently, if press rollers 10, 11 of large roller diameter are used, then differences in the elongation rate resulting from variations in the impregnation density of the active material 3 is suppressed.

Furthermore, in the second pressing step of the conventional manufacturing method, pressing is performed three times using a relatively small press roller with a diameter of 400 mm, and produces a lengthwise elongation of as much as 6%. This elongation is the cause of the bow shaped warping which occurs when the core substrate 1 is divided into individual battery electrode plates 7. In contrast, in the pressing step of the manufacturing method according to this embodiment, because only a single press working process is performed using press rollers 10, 11 with comparatively large diameters, the lengthwise elongation is restricted to a value between 1.7% and 1.9% as described above, and when the core substrate 1 is divided into individual battery electrode plates 19 in a subsequent step, almost no warping or cracking occurs.

Moreover, in the pressing step, because the opening rim sections of the two side walls 12a, 12b of the annular slots 12 formed in the working press roller 11 are curved surfaces with a radius of curvature R of 0.3 mm to 0.6 mm, the boundaries between the protrusions 8, 8 and the surrounding regions is clearly defined, and moreover rupture or deterioration of the metal skeleton of the core substrate 1 does not occur during the press working. If the radius of curvature R of the curved surfaces is set to a value greater than the range from 0.3 mm to 0.6 mm, the active material 3 of the edge of the protrusions 8, 8 may drop out and the boundaries between the protrusions 8, 8 and the surrounding regions becomes indistinct, whereas if the radius of curvature R is smaller than the aforementioned range, there is a danger of rupture or deterioration of the metal skeleton of the core substrate 1, and a battery produced using such a battery electrode plate would display a reduced current collecting efficiency.

Figure 3A:
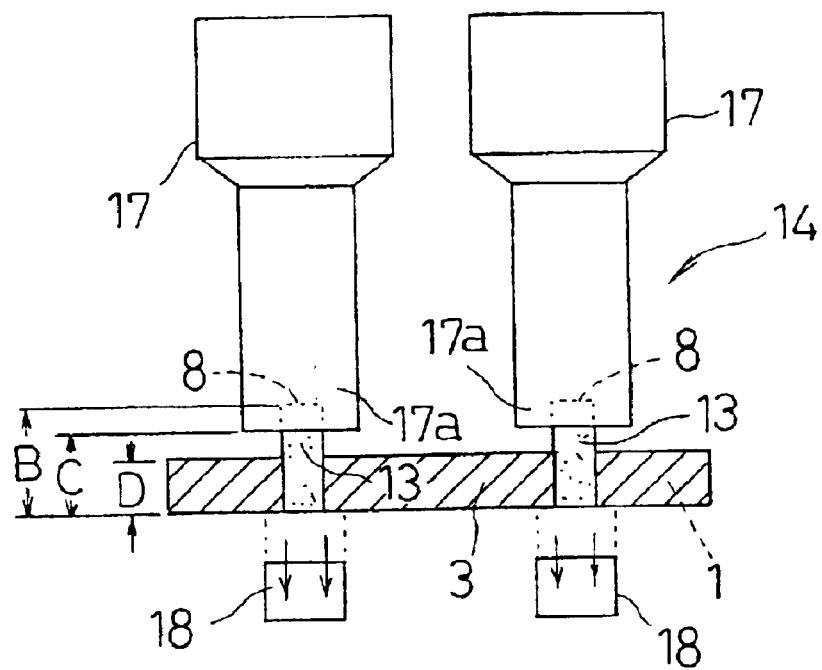
FIG. 3A is a front view showing an active material removal device used in an active material removal step.
Figure 3B:
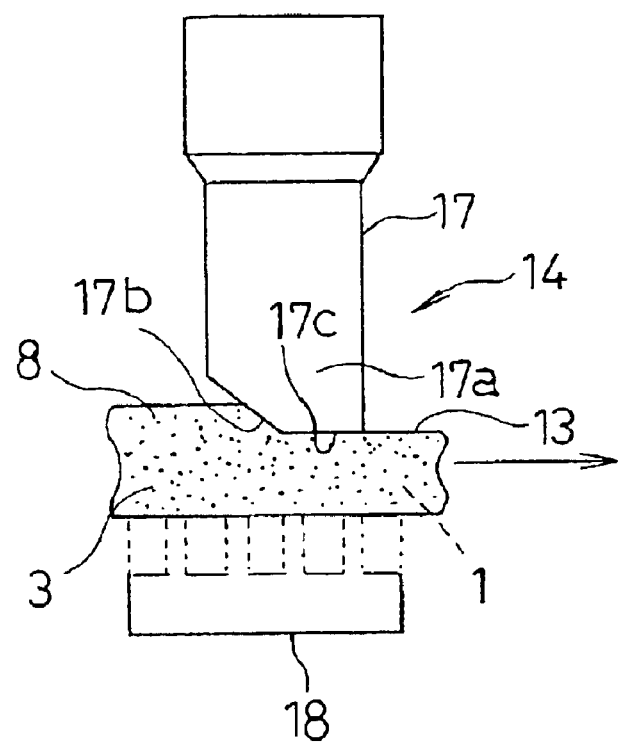
FIG. 3B is a right hand side view of the removal device.

Subsequently, in an active material removal step shown in FIG. 1D, the active material 3 impregnated within the two protrusions 8, 8 is removed, forming two rail shaped core substrate exposed sections 13, 13. FIG. 3A and FIG. 3B show an active material removal device 14 used in this step, wherein FIG. 3A is a front view and FIG. 3B is a right hand side view. The active material removal device 14 includes a pair of ultrasonic vibration devices 17, 17 for stripping away and removing active material 3 by bringing ultrasound generation horns 17a, 17a into contact with the tops of the protrusions 8, 8 and applying ultrasonic vibrations, and a pair of vacuum suction devices 18, 18 positioned in an opposing position below each of the ultrasonic vibration devices 17, 17 for suctioning active material 3 which has been stripped away and removed.

The ultrasound generation horns 17a have a sloped surface 17b, with a downhill pitch in the direction of the movement of the core substrate 1, at the contact surface with the core substrate 1, and this sloped surface 17b prevents damage to the core substrate 1. Furthermore, in order to reduce abrasion, the sloped surface 17b, and a flat contact surface 17c which is a continuation of the sloped surface 17b, are formed using sintered carbides, and the main body of the ultrasound generation horn 17a is formed from titanium.

According to this active material removal device 14, the core substrate 1 is moved in the direction of the arrow shown in FIG. 3B, with the tops of the protrusions 8, 8 held in contact with the ultrasound generation horns 17a of the pair of positionally fixed ultrasonic vibration devices 17, 17. By applying ultrasonic vibrations to each protrusion 8, the metal skeleton is squeezed and the active material 3 contained therein is stripped away and removed, while at the same time, the vacuum suction device 18 suctions out and removes active material 3 impregnated within the protrusion 8 and the region below the protrusion. As a result, the active material 3 contained within the protrusion 8 and the region therebelow is almost entirely removed, yielding a high quality core substrate exposed section 13.

As follows is a description of the reasons the residual ratio of active material 3 within the core substrate exposed section 13 is extremely low. The active material 3 to be removed in the aforementioned active material removal step is the active material impregnated within the protrusion 8, and because the protrusion 8 has not been subjected to press working, the active material 3 is extremely easy to remove. Consequently, even in the case of active material 3 which contains a binder, which has proved extremely difficult to remove using conventional methods, by applying ultrasonic vibration to the substrate by bringing the ultrasound generation horn 17a of the ultrasonic vibration device 17 into contact with the substrate while applying suction from below with the vacuum suction device 18, the active material 3 is removed easily and completely.

According to actual measurements, the active material residual ratio of a core substrate exposed section 13 formed through the aforementioned active material removal step is from 1 to 4%. In comparison, the active material residual ratio of a core substrate exposed section 4 formed in the conventional manufacturing method is much higher, at 10% or more, and furthermore lumps of active material 3 still exist, and these lumps are the main cause of spark generation during the welding of the current collecting lead plates. Accordingly, these lumps are removed by hand, which leads to a further reduction in productivity. Evaluation of the active material residual ratios described above was conducted by immersion into an aqueous solution of acetic acid, which dissolves only the active material 3 without dissolving the nickel of the core substrate 1, and subsequent calculation of the weight of residual active material 3 within the core substrate exposed section 4 or 13 based on the rate of change in the weight of the dissolved active material 3.

In order to reduce the active material residual ratio of the core substrate exposed section 13, in the case in which the thickness B of the rail shaped protrusion 8 is approximately 1.1 mm, and the thickness D of the core substrate 1 following press working is approximately 0.6 mm, the active material removal device 14 should preferably be operated with a gap C between the lower surface of the core substrate 1 and the contact surface 17c of the ultrasound generation horn 17a set to a value from 0.7 mm to 0.8 mm. Because the thickness D of the core substrate 1 following press working shown in FIG. 1C is precisely 0.58 mm, the aforementioned gap C could be set to a smaller value than the range from 0.7 mm to 0.8 mm, although setting the gap to such a small value has no effect on the active material residual ratio. In contrast, if the aforementioned gap C is set to a value greater than the 0.7 mm to 0.8 mm range, then the active material residual ratio increases.

In addition, in the active material removal device 14, the active material 3 within the protrusion 8 is in a state which is easily removed, the core substrate 1 is able to be moved rapidly and continuously across the positionally fixed ultrasonic vibration device 17 while removal of the active material 3 takes place, and the active material 3 is suctioned away by the vacuum suction device 18 underneath the protrusion 8, and as a result the active material 3 is removed efficiently, and the productivity improves markedly. According to actual measurements, because the active material 3 is in a state which is easily removed, the core substrate 1 can be moved at a rapid rate of approximately 450 mm/sec. In this active material removal step, if the movement speed of the core substrate 1 is set to a value slower than 50 mm/sec and the time taken in removing the active material 3 is extended, then not only does the productivity drop, but the core substrate 1 also begins to rupture and holes similar to worm holes begin to appear.

Furthermore, in the active material removal step, the ultrasonic vibration device 17 is set and operated so as to produce an amplitude within a range from 25 to 50 μm. If the amplitude is smaller than this range, the time required for removal of the active material 3 lengthens, whereas if the amplitude is larger than the aforementioned range, then although the removal efficiency of the active material 3 improves, the metal skeleton of the core substrate 1 ruptures and the mechanical strength deteriorates, and consequently the current collecting function deteriorates, and furthermore the active material 3 from regions near to the core substrate exposed sections 13 is also partially stripped away, meaning the linearity of the boundary line between the core substrate exposed section 13 and the other regions also deteriorates.

In the active material removal step of the embodiment, although the application of ultrasonic vibrations is used for removing the active material 3, there is no deterioration in the strength of the core substrate 1. This effect was confirmed by evaluation results from a tensile tester. In contrast, in cases in which the application of ultrasonic vibrations is used for removing the active material 3 impregnated in a conventional core substrate 1, the strength of the core substrate 1 typically falls by 50 to 70%. The reason for this observation is that in the conventional manufacturing methods, a core substrate 1 impregnated with an active material 3 is subjected to press working prior to the application of ultrasonic vibrations to the regions to become current collectors, and consequently the active material 3 is in a state which is extremely difficult to remove. In contrast, in this embodiment, the active material 3 impregnated in the protrusions 8, 8, which have undergone almost no press working, is removed, and moreover the ultrasonic vibrations are applied only to the top of the protruding protrusions 8, 8 and have little effect on the other regions, and consequently the core substrate 1 suffers no deterioration in strength.

Next, the aforementioned core substrate exposed sections 13 are lightly compressed using a different press roller (not shown in the drawings) from that shown in FIG. 2A, to yield the state shown in FIG. 1E, in which the core substrate exposed sections 13 are level with the other regions containing impregnated active material 3. Finally, by cutting along the three cutting lines shown by alternate long and short dash lines in FIG. 1E, four battery electrode plates 19 shown in FIG. 1F are obtained. Each of these battery electrode plates 19 are of the same strip form, and have a boundary line 19c along the length of the electrode plate between an active material impregnated section 19a and a current collector 19b from which the active material 3 has been removed.

According to actual measurements using a microscope, the linearity of the boundary line 19c between the active material impregnated section 19a and the current collector 19b of a battery electrode plate 19 formed via the steps described above has a small error of no more than 0.2 mm, whereas a battery electrode plate 7 produced by a conventional method displays an error of up to 0.8 mm. The reason for this observation is that whereas a conventional manufacturing method has a pressing step following the impregnation of the active material 3 in which three pressing operations are performed in order to achieve a predetermined impregnation density, in the manufacturing method of this embodiment, only a single press working step, for forming the protrusions 8, 8 shown in FIG. 1C on the core substrate 1, is performed. Accordingly, in the battery electrode plate 19 obtained in the embodiment, the core substrate exposed section 13 can be folded and then compressed to produce the current collector 19b, and by so doing, the mechanical strength and the density of the current collector 19b is increased, and moreover, the current collecting efficiency is also improved.

Furthermore, in the battery electrode plate 19, the variation in the impregnation density of the active material impregnated section 19a is suppressed to no more than 1.5%. This is because the active material 3 is impregnated into the smooth core substrate 1 prior to press working. In contrast, in a battery electrode plate 7 obtained by conventional method, a core substrate 1 which has been press worked and includes surface irregularities is impregnated with the active material 3, and so it is impossible to ensure a uniform degree of impregnation across the entire substrate, and the active material impregnated section 7a displays a variation in impregnation density of at least 3.5%.

Figure 4:
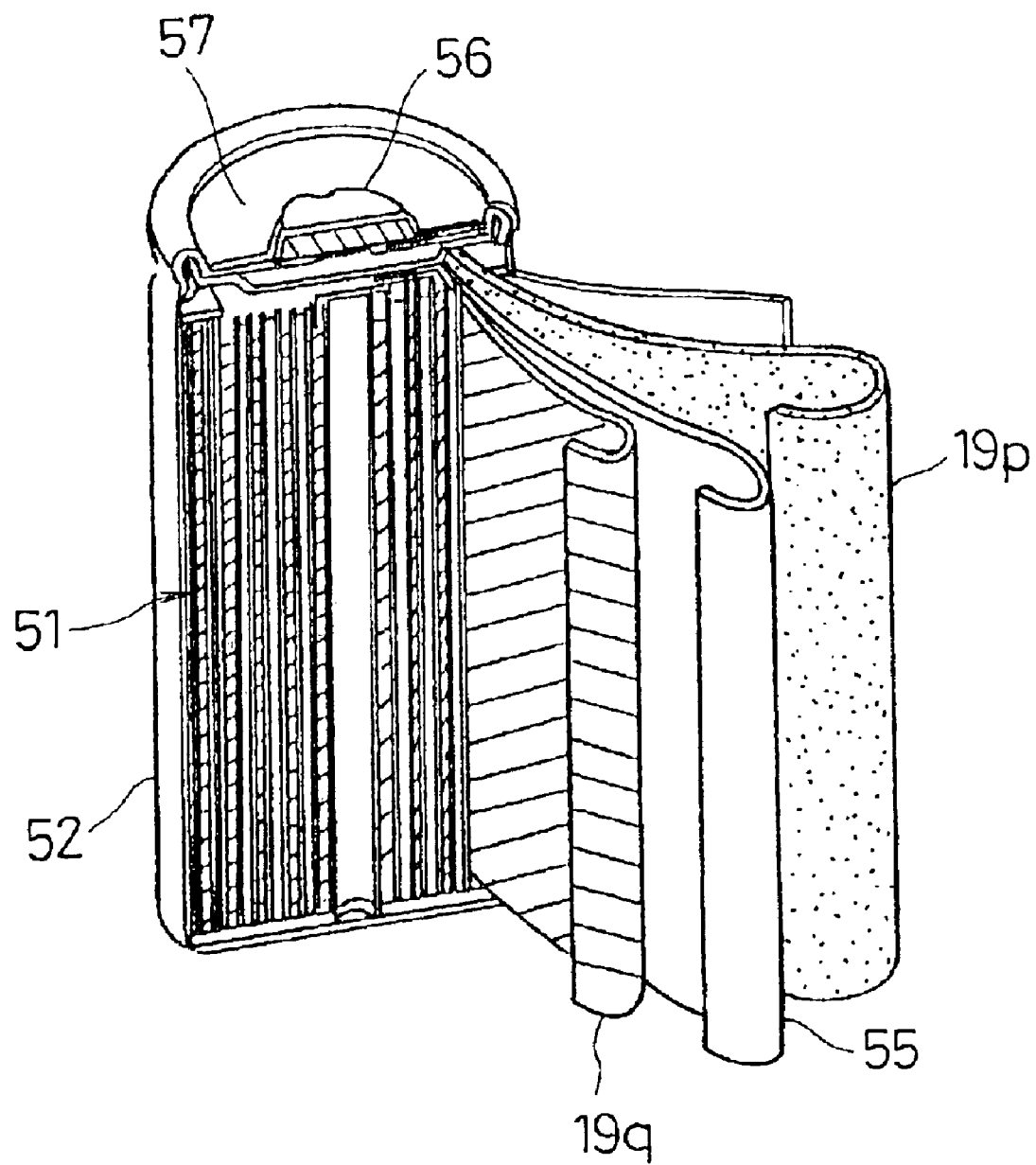
FIG. 4 is a partially cutaway perspective view showing a cylindrical battery containing a battery electrode plate produced by the above method.

FIG. 4 shows a nickel-metal hydride battery in which an electrode group 51, including battery electrode plates 19p, 19q of a positive electrode and a negative electrode produced by the above-described method spirally wound with a separator 55 interposed therebetween, is housed inside a cylindrical battery case 52. In this cylindrical battery, a positive electrode terminal 56 of a sealing plate 57, and the positive electrode plate 19p are electrically connected via a lead, and the battery case 52 which functions as a negative electrode, and the negative electrode plate 19q are electrically connected via a lead. The inside of the battery case 52 is filled with an electrolyte.

FIG. 5A through FIG. 5G are perspective views showing the sequence of production steps in a method for manufacturing a battery electrode plate according to a second embodiment of the present invention. The aforementioned first embodiment described a method for manufacturing a battery electrode plate 19 for forming a spirally wound electrode group for use in a cylindrical battery, whereas this second embodiment relates to a method of manufacturing battery electrode plates for forming a laminated electrode group for use in a prismatic battery. In FIG. 5A through FIG. 5G, those components which are identical with, or equivalent to those shown in FIG. 1A through FIG. 1F are labeled with the same reference numerals.

First, an entire core substrate 1 formed from a rectangular or strip shaped piece of foamed metal of a predetermined size, as shown in FIG. 5A, is impregnated with an active material 3 as shown in FIG. 5B. In this case, the active material 3 is impregnated into a totally flat core substrate 1 prior to press working, and so is impregnated with a uniform density throughout the entire core substrate 1, and moreover because the surface of the core substrate 1 is not irregular, namely there are no elevation differences, the active material 3 is retained within the substrate without flowing, and consequently dries with the uniform impregnation density maintained.

Next, as shown in FIG. 5C, the entire surface of the core substrate 1 uniformly impregnated with the active material 3, with the exception of those sections which form core substrate exposed sections in subsequent steps, is subjected to press working, and the thickness of the substrate is compressed to approximately half, and the sections which form core substrate exposed sections in subsequent steps are left as two parallel rail shaped protrusions 20, 20. In this pressing step, a stripe roller press device (not shown in the drawings) of the same basic construction as the stripe roller press device 9 shown in FIG. 2A is used, and includes a working press roller with annular slots provided at positions corresponding to the protrusions 20, 20 shown in FIG. 5C.

Subsequently, in an active material removal step, the active material 3 impregnated within the two protrusions 20, 20 is removed to form two core substrate exposed sections 21, 21. In this active material removal step, an active material removal device (not shown in the drawings) is used which has a construction almost identical with that of the active material removal device 14 including an ultrasonic vibration device 17 shown in FIG. 3A and FIG. 3B, and the processing performed is identical with that described for the first embodiment.

The core substrate exposed sections 21, 21 are then lightly compressed using a press roller (not shown in the drawings), in a similar manner to the first embodiment, to yield a state in which the core substrate exposed sections 21, 21 are level with the other regions containing active material 3. Subsequently, as shown in FIG. 5D, the aforementioned core substrate exposed sections 21, 21 are further compressed using the press roller so that the upper surfaces thereof are at a lower level than the regions containing active material 3. Next, a strip shaped lead, namely a lead hoop 22, is seam welded to each of the core substrate exposed sections 21, 21. Finally, by cutting or punching along each of the cutting lines shown by alternate long and short dash lines in FIG. 5F, a plurality of battery electrode plates 23 shown in FIG. 5G are obtained. Each of these battery electrode plates 23 are of the same form, and include an active material impregnated section 23a, a current collector 23b from which the active material 3 has been removed, and a lead plate 23c which is fixed to the current collector 23b.

This method for manufacturing a battery electrode plate 23 includes essentially the same steps as the first embodiment, and as such is capable of achieving similar effects to those described above for the first embodiment, and so high quality battery electrode plates 23 for use in a prismatic battery are produced with high productivity. Moreover, instead of the step for welding the lead hoop 22, the active material impregnated core substrate 1 without a welded lead hoop 22 could also be divided in two by cutting along the cutting line shown down the center of FIG. 5F, the core substrate exposed section 21 then folded over and compressed to form a current collector, and the substrate then divided into individual battery electrode plates. The aforementioned process increases the mechanical strength and the density of the current collector, and also improves the current collection efficiency, and consequently enables the formation of a stable lead fragment with the same high quality as the lead plate 23c provided by cutting the lead hoop 22.

Figure 6:
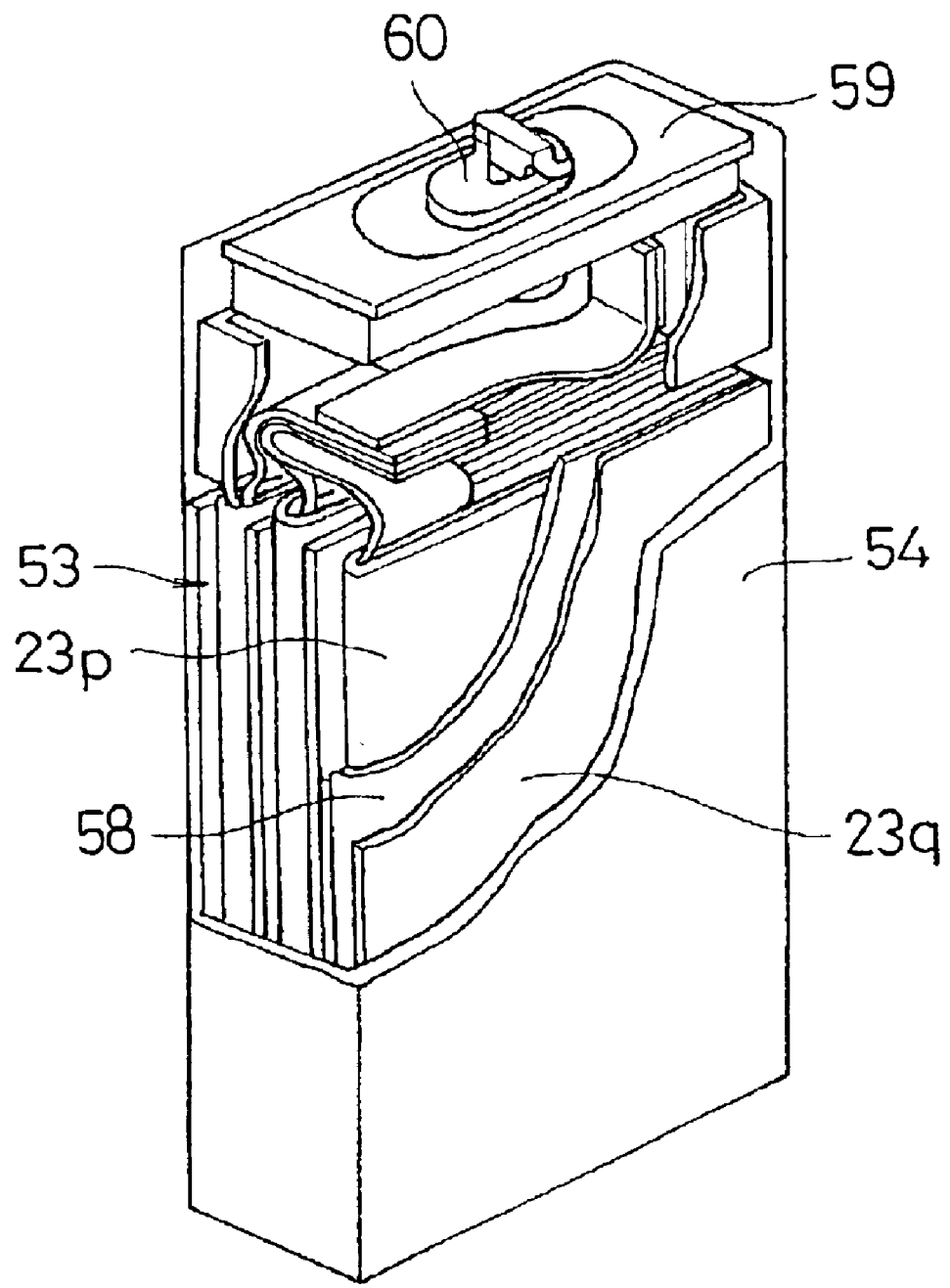
FIG. 6 is a partially cutaway perspective view of a prismatic battery containing a battery electrode plate produced by the above method.

FIG. 6 shows a nickel-metal hydride battery in which an electrode group 53, including battery electrode plates 23p, 23q of a positive electrode and a negative electrode produced by the above-described method laminated alternately with a separator 58 interposed therebetween, is housed inside a prismatic battery case 54. In this prismatic battery, a positive electrode terminal 60 of a sealing plate 59, and the positive electrode plate 23p are electrically connected via a lead, and the battery case 54 which functions as a negative electrode, and the negative electrode plate 23q are electrically connected via a lead. The inside of the battery case 54 is filled with an electrolyte.

INDUSTRIAL APPLICABILITY

According to the present invention, a battery electrode plate is obtained in which there is no variation in the impregnation density of the active material, the boundary line between the active material impregnated section and the current collector is a true straight line, the residual ratio of the active material in the current collector is low, and the entire current collector has a predetermined width. Consequently, the present invention is very useful for producing, with good efficiency, a battery with a high degree of high rate discharge characteristics.

What is claimed is:

1. A method for manufacturing a battery electrode plate, comprising:

an active material impregnation step for impregnating an entire porous core substrate shaped like a thin plate with an active material;

a pressing step for performing press working on said active material impregnated core substrate to form a plurality of rail shaped protrusions;

an active material removal step for removing the active material to form core substrate exposed sections by applying ultrasonic vibrations to said rail shaped protrusions;

a flattening step for compressing said core substrate exposed sections down to an identical level with other sections; and a cutting step for cutting predetermined sections including said core substrate exposed sections to form a battery electrode plate.

2. A method for manufacturing a battery electrode plate, comprising:

an active material impregnation step for impregnating an entire porous core substrate shaped like a thin plate with an active material;

a pressing step for performing press working on said active material impregnated core substrate to form a plurality of rail shaped protrusions;

an active material removal step for removing the active material to form core substrate exposed sections by applying ultrasonic vibrations to said rail shaped protrusions;

a core substrate exposed section compression step for compressing said core substrate exposed sections;

a lead welding step for seam welding a lead hoop to said core substrate exposed sections; and a cutting step for cutting predetermined sections including said lead hoop to form a battery electrode plate.

* * * * *